CARD & STEWART.
Car Coupling.
No. 54,683.            Patented May 15, 1866.
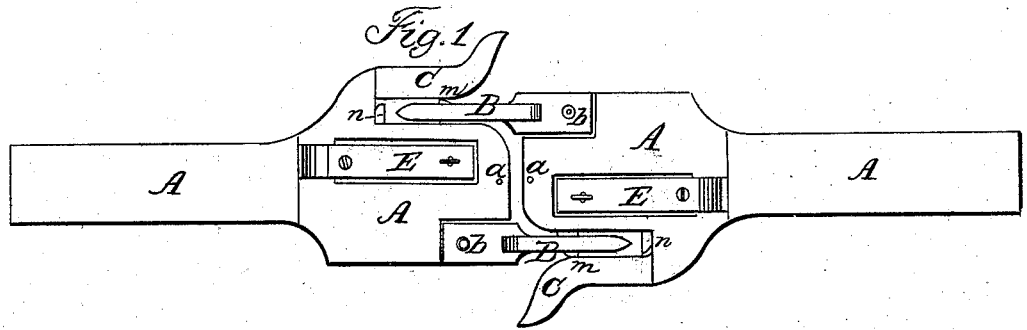
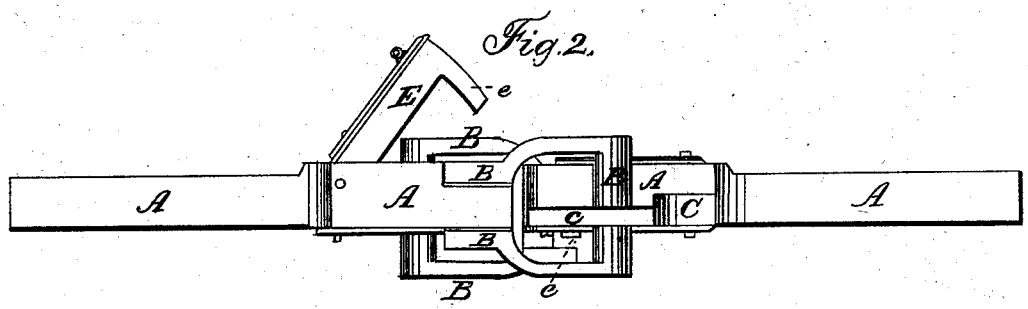
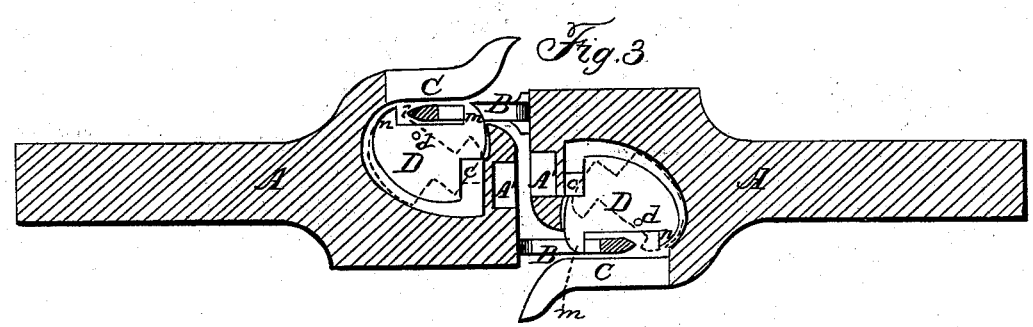
Witnesses:
J. W. Heuthel
G. W. Reed
Inventors:
Miles H. Card
John W. Stewart
by Coburn Mans
Attorney

UNITED STATES PATENT OFFICE.

MILES H. CARD, OF FULTON, ILLINOIS, AND JOHN W. STEWART, OF LYONS, IOWA.

IMPROVED CAR-COUPLING.

Specification forming part of Letters Patent No. 54,683, dated May 15, 1866.

*To all whom it may concern:*

Be it known that we, MILES H. CARD, of Fulton, in the county of Whitesides and State of Illinois, and JOHN W. STEWART, of Lyons, in the county of Clinton and State of Iowa, have invented a new and useful Improvement in Car-Couplings; and we do hereby declare and make known that the following is a full, clear, and exact description of the same, reference being had to the accompanying drawings, and the letters and figures marked thereon, which form part of this specification.

The nature of our said invention consists in a novel mode of constructing a coupling device to be attached to the ends of railroad-cars for the purpose of coupling them together, whereby the cars may be coupled automatically in a secure and reliable manner, thus obviating the necessity of going in between the cars for that purpose, which is always attended with great inconvenience and danger.

To enable those skilled in the art to understand how to construct and make use of our said invention, we will proceed to describe the same with particularity, making reference in so doing to the aforesaid drawings, in which—

Figure 1 represents a plan or top view of our invention; Fig. 2, a side elevation of the same, and Fig. 3 a horizontal section thereof at $x$ in Fig. 2.

Similar letters of reference in the different figures indicate the same parts of our invention.

A represents the draw-heads, which are attached to the cars in any suitable manner, B representing the links, which are secured to said draw-heads upon one side thereof, as shown, by means of the removable pins marked $b$, so that by removing said pins either link may be turned out laterally, in which position it may be secured by replacing said pin when desired.

C represents guards arranged upon one side of the draw-heads, forming a recess, into which the projecting ends of the connecting-links enter, as shown.

The corner of the draw-head is rounded off and the ends of said guards curve outward, so as to insure the entrance of said links into the recesses formed therefor, as aforesaid.

Within said draw-heads there are suitable chambers or recesses to contain the cams D. which open out laterally into the aforesaid recesses for receiving the links B, so as to per mit said cams to operate within said links and upon them, as hereinafter described.

The said cams are pivoted at $d$, so as to have a motion about said points from the position shown by the full lines in Fig. 3, when the cars are coupled, to the position indicated by the dotted lines in said Fig. 3, when the coupling is released. The shoulder $m$ upon said cams passes through the connecting-links B in the former position, the pin $e$ upon the arm E passing through a suitable aperture or recess in the said cams when in the said position to keep them securely in place.

As the cars are run together, and the link B enters its appropriate recess upon the opposite draw-head, if the cam D should happen to be in the position indicated by the full lines the pressure of said link upon the cam causes the catch $m$ to recede within the chamber when the link passes said catch, and, striking upon the projection $n$ upon said cam, throws the catch $m$ around within the link, when the pin $e$ upon the pivoted arm E, dropping through the aforesaid recess $c$ in the cam, holds it securely in place and thus couples the cars.

When the cars are to be uncoupled or detached from each other the arm E is raised up by means of a cord or chain attached thereto, when the cams are pressed back and the links are readily withdrawn. When the cams are thus moved back within the chamber the end of the pin $e$ may rest upon the same, and will then fall into the aforesaid recess $c$ in said cam as soon as the link has entered its recess and brought the projection $m$ within it.

In the abutting ends of the draw-heads are the usual recesses to receive the ordinary coupling-links, and vertical holes $a$, through which a pin may be passed to secure them.

In practice, one of said links B is sufficient, and the other may be turned back out of the way, as aforesaid.

If by any possibility one link should break, then the other might be used, and all delay be avoided. Should both become broken or get out of order, then the old method of coupling still remains, and may be used.

Having described our invention in its construction and mode of operation, we will specify what we claim and desire to secure by Letters Patent:

1. The combination and arrangement of the guards C, links B, and cams D with the drawhead A, substantially as and for the purposes specified.

2. In combination with the links B and cams D, provided with the shoulders m, the employment of the pin or stop e, arranged and operating substantially as specified and shown.

3. Providing the cam with the projection n, operating as set forth.

MILES H. CARD.
              JOHN W. STEWART.

Witnesses:
    E. SUMMERS,
    C. F. WELLES.